United States Patent
Lich et al.

(10) Patent No.: US 7,740,098 B2
(45) Date of Patent: Jun. 22, 2010

(54) METHOD FOR DETERMINING A TRIGGERING DECISION FOR MEANS OF RESTRAINT OF A MOTOR VEHICLE

(75) Inventors: Thomas Lich, Schwaikheim (DE); Michael Schmid, Kornwestheim (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 727 days.

(21) Appl. No.: 11/629,640

(22) PCT Filed: Apr. 12, 2005

(86) PCT No.: PCT/EP2005/051603

§ 371 (c)(1), (2), (4) Date: Dec. 15, 2006

(87) PCT Pub. No.: WO2005/123460

PCT Pub. Date: Dec. 29, 2005

(65) Prior Publication Data

US 2007/0182138 A1  Aug. 9, 2007

(30) Foreign Application Priority Data

Jun. 17, 2004  (DE)  ........................ 10 2004 029 374

(51) Int. Cl.
*B60K 28/16* (2006.01)
*B60R 21/01* (2006.01)

(52) U.S. Cl. ........................ 180/282; 280/734; 280/735; 280/757

(58) Field of Classification Search ................. 180/282; 280/734, 735, 757; 701/45
See application file for complete search history.

(56) References Cited

U.S. PATENT DOCUMENTS

| | | | | |
|---|---|---|---|---|
| 3,719,246 A * | 3/1973 | Bott | ........................... | 180/197 |
| 4,671,534 A * | 6/1987 | Yano | ....................... | 280/5.508 |
| 5,328,256 A * | 7/1994 | Ohta et al. | .................. | 303/146 |
| 5,605,202 A * | 2/1997 | Dixon | ........................ | 180/268 |
| 6,169,946 B1 * | 1/2001 | Griessbach | .................. | 701/45 |
| 6,256,565 B1 * | 7/2001 | Yanagi et al. | ................. | 701/45 |
| 6,292,759 B1 | 9/2001 | Schiffmann | | |
| 6,304,805 B1 * | 10/2001 | Onogi | ......................... | 701/36 |
| 6,332,104 B1 * | 12/2001 | Brown et al. | ................... | 701/1 |
| 6,390,498 B1 * | 5/2002 | Francis et al. | ............... | 280/735 |
| 6,394,495 B1 * | 5/2002 | Specht | ....................... | 280/806 |
| 6,421,591 B1 * | 7/2002 | Hackenberg | ................. | 701/45 |
| 6,856,868 B1 * | 2/2005 | Le et al. | ........................ | 701/38 |
| 6,915,199 B2 * | 7/2005 | Fujioka et al. | ................ | 701/70 |
| 6,982,635 B2 * | 1/2006 | Obradovich | ................. | 340/439 |
| 7,020,552 B2 * | 3/2006 | Park | ............................ | 701/45 |

(Continued)

FOREIGN PATENT DOCUMENTS

DE  196 32 836  11/1997

(Continued)

*Primary Examiner*—Paul N Dickson
*Assistant Examiner*—Laura Freedman
(74) *Attorney, Agent, or Firm*—Kenyon & Kenyon LLP

(57) ABSTRACT

A method for determining a triggering decision for restraint device of a motor vehicle, in response to a preceding skidding maneuver. A yaw rate, a first driving dynamics parameter set and a context parameter set are made available. The triggering decision being determined using the yaw rate, the first vehicle parameter set and the context parameter set.

10 Claims, 3 Drawing Sheets

U.S. PATENT DOCUMENTS

| | | | |
|---|---|---|---|
| 7,096,103 B2 * | 8/2006 | Salib et al. | 701/38 |
| 7,120,528 B2 * | 10/2006 | Salib et al. | 701/45 |
| 7,142,965 B2 * | 11/2006 | Metzger et al. | 701/45 |
| 7,197,388 B2 * | 3/2007 | Xu et al. | 701/70 |
| 7,206,680 B2 * | 4/2007 | Roelleke | 701/45 |
| 2004/0024505 A1 * | 2/2004 | Salib et al. | 701/38 |
| 2004/0073346 A1 | 4/2004 | Roelleke | |
| 2006/0015237 A1 * | 1/2006 | Kroeninger et al. | 701/70 |
| 2007/0168098 A1 * | 7/2007 | Lich et al. | 701/46 |

FOREIGN PATENT DOCUMENTS

| | | |
|---|---|---|
| DE | 199 10 596 | 9/2000 |
| DE | 101 49 112 | 4/2003 |
| EP | 1 022 709 | 7/2000 |

* cited by examiner

METHOD FOR DETERMINING A TRIGGERING DECISION FOR MEANS OF RESTRAINT OF A MOTOR VEHICLE

FIELD OF THE INVENTION

The present invention relates to a method for determining a triggering decision for a restraint device of a motor vehicle, in response to a preceding skidding maneuver.

BACKGROUND INFORMATION

German Patent Application No. DE 101 49 112 A1 describes a method for determining a triggering decision for a restraint device in a vehicle. In this method, a triggering decision is determined as a function of a sideslip angle, a vehicle transversal speed and a vehicle tilt angle. The vehicle tilt angle, in this case, is characterized by a vehicle transversal acceleration and/or a vehicle transversal speed. In addition, in this method, passenger detection features may also be used.

SUMMARY

Compared to the conventional design approach, a method according to an example embodiment of the present invention for determining a triggering decision for a restraint device of a motor vehicle in response to a preceding skidding maneuver may have the advantage that a yaw rate of the vehicle enters directly into the determination of the triggering decision for the restraint device. The yaw rate is, for example, the rotary speed about the vertical axis of the vehicle, measured in degrees per second. By taking into consideration the yaw rate in determining the triggering decision for the restraint device, both the kinetic energy and the rotational energy may be calculated, which would be available during a potential rollover procedure of the vehicle. Furthermore, it may be an advantage of the method according to the example embodiment of the present invention that only data for the determination of the triggering decision are used that are already present in the vehicle. The yaw rate is available, for example, through the ESP system (ESP=electronic stability program) or another system for vehicle dynamics control (e.g. DSC, VDC). This generates a multiple usage for the sensor system, and costs for additional special systems are saved.

A substantial advantage is also the thereby improved passenger protection, since the restraint device(s) is/are able to be triggered adapted to the situation, and, this being the case, a better timing adjustment to the accident occurrence can take place. An additional substantial advantage of the situation-adapted determination of triggering decisions, using the yaw rate, is that not only triggering in response to rollover procedures can be optimized, but also triggering in front and side areas.

In accordance with an example embodiment of the present invention, a method for the determination of a triggering decision for a restraint device in a motor vehicle is made available, in response to a preceding skidding maneuver, first a yaw rate, a first driving dynamics parameter set and a context parameter set being made available; and then the triggering decision being determined using the yaw rate, the first vehicle parameter set and the context parameter set.

According to one preferred refinement, the first driving dynamics parameter set has a lateral acceleration and a longitudinal speed of the motor vehicle.

According to an additional preferred refinement, a broadening of the first driving dynamics parameter set further has a steering angle, a longitudinal acceleration, a vertical acceleration and a roll rate of the motor vehicle.

According to one additional preferred further improvement, the context parameter set has in each case a weight parameter, a size parameter and/or a position parameter for each vehicle passenger. One advantage of this preferred refinement is that the triggering of the restraint device for the respective vehicle passenger may be determined on an individual basis. This may be important since, for example, since different restraint devices may be used in a different manner for a baby or an adult.

According to one additional preferred refinement, the determination of the triggering decision is carried out using the first driving dynamics parameter set and the yaw rate.

According to still another preferred further development, for the determination of the triggering decision, in addition, a sideslip angle is made available and used. Advantageously, the utilization of the sideslip angle, may also be utilized for the method according to the present invention. Furthermore, it is possible to measure the sideslip angle directly, using a sensor device, and to make it available as a variable.

According to still another preferred refinement, the sideslip angle is calculated using the first driving dynamics parameter set. Advantageously, therefore, an additional parameter is available for determining the triggering decision. The use of an expensive sideslip angle sensor is not necessary, since the sideslip angle is able to be calculated from the first driving dynamics parameter set.

According to yet another preferred refinement, a lateral speed of the vehicle is made available and used also for determining the triggering decision, which is calculated using the first driving dynamics parameter set. Consequently, an additional parameter for an improvement in the determination of the triggering decision is available, without one's having to use another additional sensor. Thereby costs and an integrating increased expenditure is saved. Alternatively, if a sensor device is used for determining the sideslip angle, from this the lateral speed may be ascertained and made available.

According to a further preferred refinement, in order to determine the triggering decision, a rollover probability for the motor vehicle is made available and used, which is calculated using the yaw rate, the lateral speed and the sideslip angle.

In one further preferred refinement, to determine the triggering decision, an angle of entrance is made available and used, which establishes the entrance of the vehicle from a first ground (on which the vehicle is moving) to a second ground during the skidding procedure, and which is calculated using the sideslip angle. The energy available to the vehicle, in this context, is calculated continually. This is composed of kinetic and rotary energy. When the vehicle, for example, enters a green strip or a side strip from the roadway, this brings about increased lateral accelerations, which represent an index of a deceleration occurring. With the aid of the integration of the lateral acceleration, the reduced energy is calculated. The difference between the total energy and the reduced energy calculated in the preliminary stages is used as the input for a parameterizable table, from which the probability of a rollover procedure may then be generated.

Moreover, from such a parameterizable table, one may generate a triggering time for the respective restraint device.

According to still another preferred refinement, the yaw rate, the first driving dynamics parameter set, the context parameter set, the sideslip angle, the entrance angle, the lateral speed and the rollover probability are made available, using a data bus within the vehicle for a restraint device triggering unit. The restraint device triggering unit determines the triggering decision, and triggers thereby the corresponding restraint device.

The data bus may, for example, be developed as a CAN bus, and the restraint device triggering unit as an air bag control system. One advantage of this preferred refinement is that all the parameters are inherently already present in the vehicle system, and thus no new sensors are required. Thereby costs and a high integrating increased expenditure is saved.

According to yet another preferred improvement, at least one of the restraint device, seat belt tensioner, roll bar, adjustable head rests and/or one or more air bags is triggered by the restraint device triggering unit, using the determined triggering decision. Even reversible restraint devices may be triggered by the restraint device triggering unit, using the determined triggering decision. Examples of various air bags are a head air bag, side air bags and front air bags. Examples for reversible restraint devices are reversible seat belt tensioners. Consequently, using the triggering decision or triggering decisions, advantageously it may be adaptively and selectively determined which restraint device are to be triggered. The triggering decision is determined adaptively with regard to the driving situation in which the vehicle is at the moment, and with regard to the vehicle's passengers, and especially to the context parameters, the weight parameters, the size parameters and the position parameters, and selectively with regard to the choice of the restraint device.

According to one additional preferred refinement, the determination of the triggering decision is carried out using the context parameter set, the lateral speed, the entrance angle and the yaw rate.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

In the figures, identical numerals denote the same or generally functionally equivalent component parts.

Figure 1:
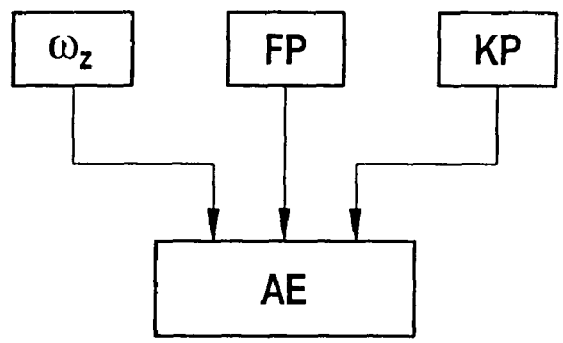
FIG. 1 shows a schematic block diagram of a first exemplary embodiment for the determination according to the present invention of a triggering decision for restraint device.

FIG. 1 shows a schematic block diagram of a first exemplary embodiment for the determination according to the present invention of a triggering decision for a restraint device of a motor vehicle in response to a preceding skidding maneuver. As shown in FIG. 1, a first driving dynamics parameter set FP, a context parameter set KP and a yaw rate $\omega_z$ are made available. The yaw rate $\omega_z$ is, e.g., the rotary speed of the vehicle about its vertical axis, measured in degrees per second. Yaw rate $\omega_z$, first driving dynamics parameter set FP and context parameter set KP are made available by a driving dynamics control system of the vehicle and/or by the restraint device triggering unit. An example for a driving dynamics control system is the ESP system. An example of a restraint triggering unit is an air bag control system.

Using yaw rate $\omega_z$, first driving dynamics parameter set FP and context parameter set KP, that were made available, one then determines triggering decision AE. Determining triggering decision AE may take place, for example, based on rules, using fuzzy logic or using a neuronal network. For instance, triggering decision AE may be determined by an air bag control system. Examples of restraint devices are seat belt tensioners, rollover bars, adjustable head rests and/or one or more air bags.

Yaw rate $\omega_z$, first driving dynamics parameter set FP and context parameter set KP are made available, e.g., by a data bus of the vehicle. An example of a data bus within the vehicle is a CAN bus.

Figure 2A:
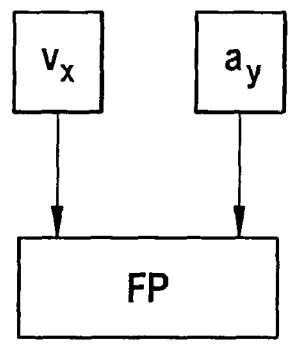
FIG. 2a shows a schematic block diagram of the first driving dynamics parameter set for the explanation of the exemplary embodiments.

FIG. 2a shows a schematic block diagram of the first driving dynamics parameter set. First driving dynamics parameter set FP has a lateral acceleration $a_y$ and a longitudinal speed $v_x$ of the motor vehicle.

Figure 2B:
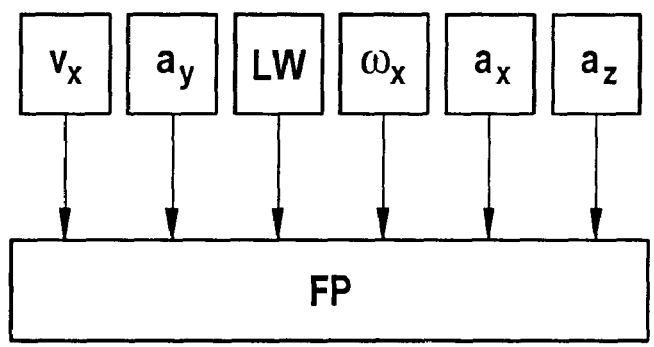
FIG. 2b shows a schematic block diagram of a broadening of the first driving dynamics parameter set for the explanation of the exemplary embodiments.

An optimal broadening of first driving dynamics parameter set FP, which is shown in FIG. 2b, also has a steering angle LW, a vertical acceleration $a_x$, a longitudinal acceleration $a_x$ and a roll rate $\omega_z$ of the motor vehicle.

Preferably roll rate $\omega_x$, lateral acceleration $a_y$, vertical acceleration $a_z$, and longitudinal acceleration $a_x$ are made available by an air bag control unit, while steering angle LW and longitudinal speed $v_x$ are made available by the ESP system of the vehicle. Furthermore, lateral acceleration $a_y$ and/or longitudinal acceleration $a_x$ may also be made available by the ESP (=electronic stability program) or another vehicle dynamics control system. First driving dynamics parameter set FP may include still further parameters, for instance, additional data from the ESP system.

Figure 3:
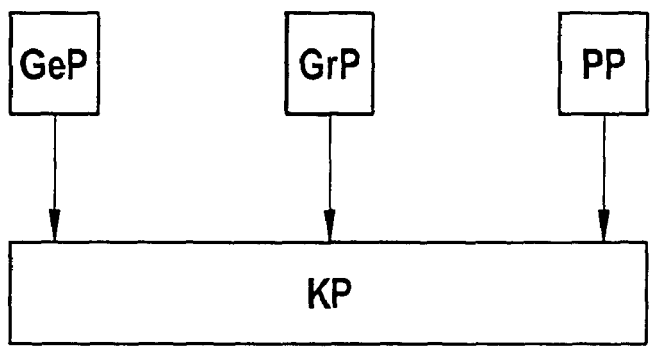
FIG. 3 shows a schematic block diagram of the context parameter set for the explanation of the exemplary embodiments.

FIG. 3 shows a schematic block diagram of the context parameter set. Context parameter set KP in each case has a weight parameter GeP, a size parameter GrP and/or a position parameter PP for each passenger. These parameters are recorded by special sensors and made available to a restraint device triggering unit. Context parameter set KP may include further parameters; for instance, parameters such as type of street paving, weather, etc, may be included in context parameter set KP.

Figure 4:
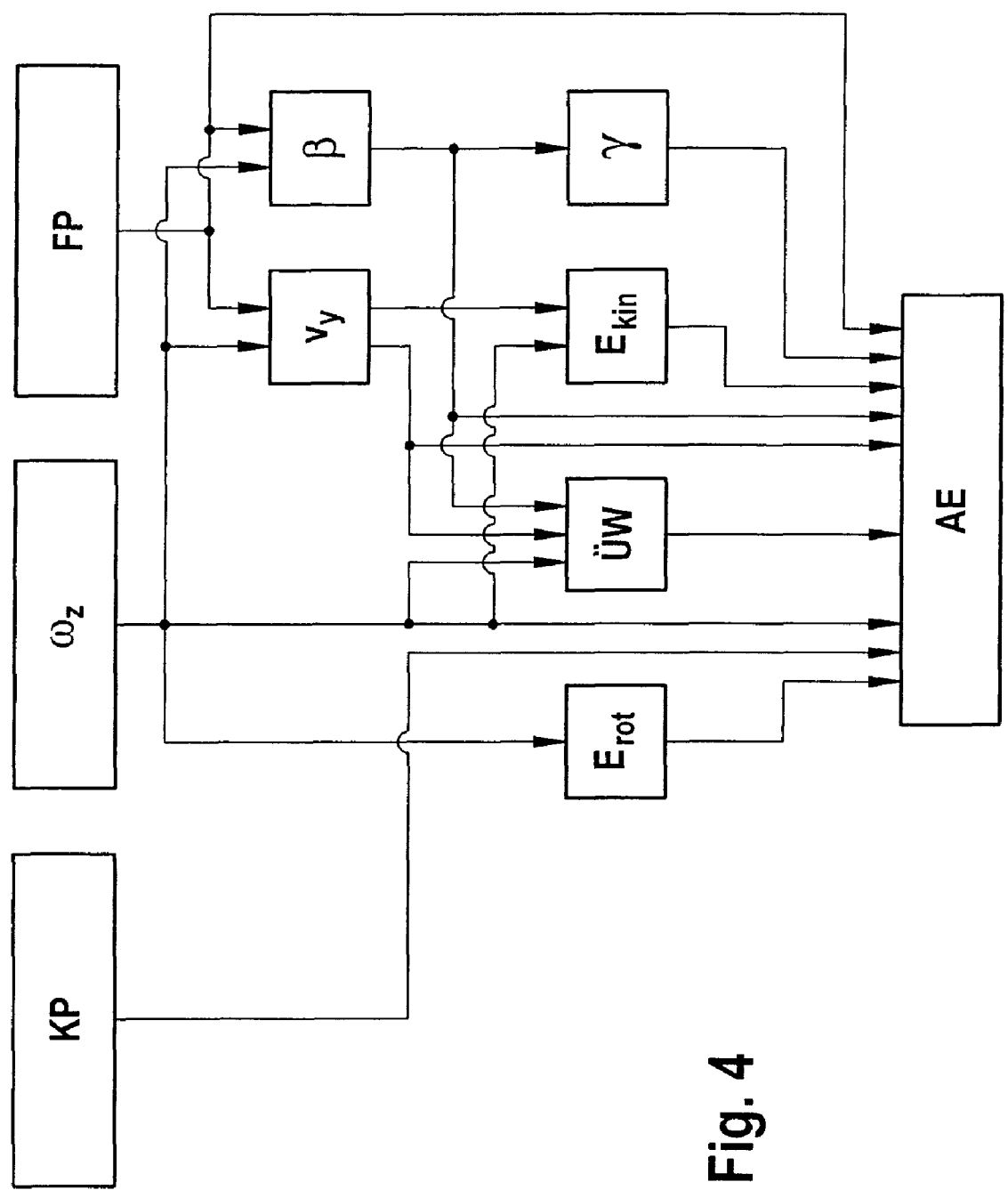
FIG. 4 shows a schematic block diagram of a second exemplary embodiment for the determination according to the present invention of a triggering decision for a restraint device.

FIG. 4 shows a schematic block diagram of a second exemplary embodiment for the determination according to the present invention of a triggering decision for means of restraint. Analogous to FIG. 1, context parameter set KP, yaw rate $\omega_z$ and first driving dynamics parameter set FP are made available. Preferably context parameter set KP has parameters analogous to FIG. 3. Preferably, first driving dynamics parameter set FP has parameters analogous to FIG. 2a or FIG. 2b.

Using first driving dynamics parameter set FP and yaw rate $\omega_z$, a lateral speed $v_y$ is calculated for the vehicle. Moreover, using yaw rate $\omega_z$ and first vehicle parameter set FP the sideslip angle is calculated. Furthermore, using yaw rate $\omega_z$ the available rotary energy $E_{rot}$ is calculated. Using yaw rate $\omega_z$, lateral speed $v_y$ and sideslip angle β, rollover probability ÜW for the vehicle is calculated. Using yaw rate $\omega_z$ and lateral speed $v_y$, the available kinetic energy $E_{kin}$ of the vehicle is calculated.

Using sideslip angle $\beta$, entrance angle $\lambda$ is calculated. Entrance angle $\lambda$ defines the entrance of the vehicle from a first type of ground, for instance the road, to a second type of ground, for instance, a road shoulder. Entrance angle $\lambda$ is calculated from:

$$\lambda = 90° - \beta$$

Using context parameter set KP, rotary energy $E_{rot}$, kinetic energy $E_{kin}$, yaw rate $\omega_z$, rollover probability ÜW, lateral speed $v_y$, sideslip angle $\beta$, entrance angle $\lambda$ and first driving dynamics parameter set FP, triggering decision AE for restraint devices of the vehicle is calculated. Preferably, the calculation of the triggering decision is carried out using an air bag control system.

Yaw rate $\omega_z$, first driving dynamics parameter set FP, context parameter set KP, sideslip angle $\beta$, entrance angle $\lambda$, lateral speed $v_y$ and rollover probability ÜW are made available for a restraint device triggering unit, using a data bus, preferably a CAN bus, within the vehicle. The restraint device triggering unit, preferably an air bag control system, determines the triggering decision and triggers thereby restraint devices, such as air bags.

Figure 5:
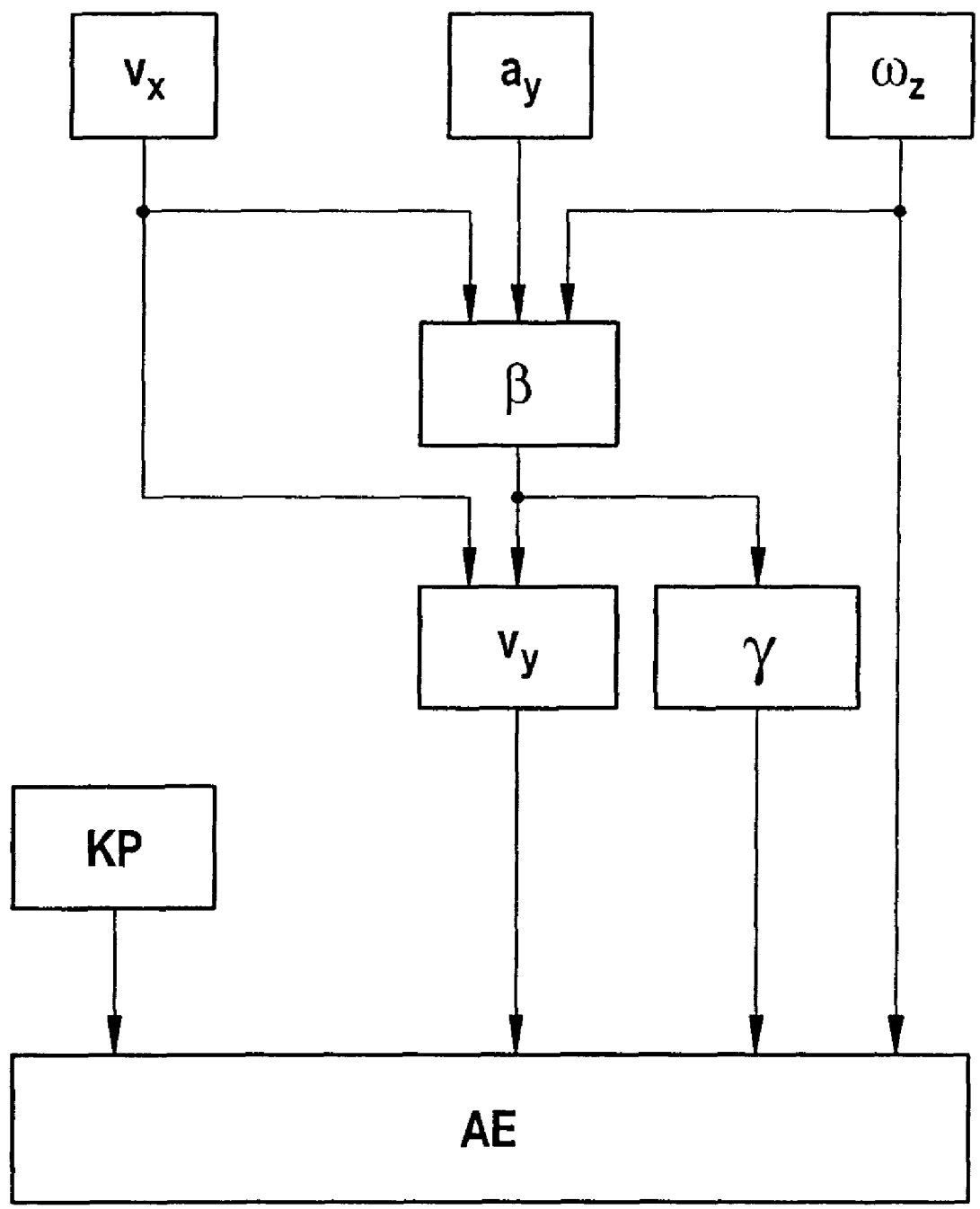
FIG. 5 shows a schematic block diagram of a third exemplary embodiment for the determination according to the present invention of a triggering decision for a restraint device.

FIG. 5 shows a schematic block diagram of a third exemplary embodiment for the determination according to the present invention of a triggering decision for restraint devices. A longitudinal speed $v_x$ and a lateral acceleration $a_y$, which are to be counted among first driving dynamics parameter set FP, are made available, besides yaw rate $\omega_z$. Sideslip angle $\beta$ is calculated using longitudinal speed $v_x$, lateral speed $a_y$ and yaw rate $\omega_z$.

Lateral speed $v_y$ is calculated using longitudinal speed $v_x$ and sideslip angle $\beta$. Entrance angle $\lambda$ is calculated using sideslip angle $\beta$, entrance angle $\lambda$, as was described above, being defined by the difference between 90° and sideslip angle $\beta$. Using context parameter set KP, lateral speed $v_y$, entrance angle $\lambda$ and yaw rate $\omega_z$, triggering decision AE is calculated.

Although the present invention was described above on the basis of preferred exemplary embodiments, it is not limited to them, but can be modified in various ways. Thus, in particular, the selection of the first driving dynamics parameters and the selection of the context parameters may be broadened by including further parameters.

What is claimed is:

1. A method for determining a triggering decision for a restraint device of a motor vehicle in response to a preceding skidding maneuver, comprising:
   making available an angle of entrance, a yaw rate, a first driving dynamics parameter set and a context parameter set;
   determining the triggering decision using the angle of entrance, the yaw rate, the first driving dynamics parameter set and the context parameter set; and
   wherein the angle of entrance:
   establishes an entrance of the vehicle from a first type of ground to a second type of ground during the skidding; and
   is calculated using a sideslip angle.

2. The method as recited in claim 1, wherein the first driving dynamics parameter set includes a lateral acceleration of the motor vehicle and a longitudinal speed of the motor vehicle.

3. The method as recited in claim 2, wherein the first driving dynamics parameter set further includes a steering angle of the motor vehicle, a longitudinal acceleration of the motor vehicle, a vertical acceleration of the motor vehicle and a roll rate of the motor vehicle.

4. The method as recited in claim 1, wherein the context parameter set includes at least one of a weight parameter for each passenger, a size parameter for each passenger, and a position parameter for each passenger.

5. The method as recited in claim 1, wherein the sideslip angle is one of: i) calculated using the first driving dynamics parameter set, or ii) available as a measured parameter.

6. The method as recited in claim 1, further comprising:
   making available a lateral speed of the vehicle, the lateral speed being used to determine the triggering decision, the lateral speed being one of calculated using the first driving parameter set or made available as a measured parameter.

7. The method as recited in claim 1, further comprising:
   making available a rollover probability for the motor vehicle, the rollover probability being used to determine the triggering decision, the rollover probability being calculated using the yaw rate, a lateral speed and the sideslip angle.

8. The method as recited in claim 1, wherein the yaw rate, the first driving dynamics parameter set, the context parameter set, the sideslip angle, the entrance angle, a lateral speed and a rollover probability are made available, using a data bus within the vehicle, for a restraint device triggering unit, which determines the triggering decision and therewith triggers the restraint device.

9. The method as recited in claim 8, wherein at least one of the restraint device, a seat belt tensioner, a roll bar, adjustable head rests, and an air bag is triggered by the restraint device triggering unit, using the determined triggering decision.

10. The method as recited in claim 1, wherein the determination of the triggering decision is carried out using a lateral speed.

* * * * *